United States Patent [19]

Fairbanks

[11] Patent Number: 5,529,340
[45] Date of Patent: Jun. 25, 1996

[54] SINGLE PIECE PATTERN AIR BAG

[75] Inventor: Douglas V. Fairbanks, Logan, Utah

[73] Assignee: Morton International, Inc., Chicago, Ill.

[21] Appl. No.: 514,539

[22] Filed: Aug. 14, 1995

[51] Int. Cl.[6] ................................................. B60R 21/16
[52] U.S. Cl. ................................. 280/743.1; 280/728.1
[58] Field of Search ................................ 280/728.1, 731, 280/732, 743.1

[56] References Cited

U.S. PATENT DOCUMENTS

| | | | |
|---|---|---|---|
| 3,810,654 | 5/1974 | DeBano, Jr. et al. | 280/743.1 |
| 4,006,918 | 2/1977 | MacFarland | 280/729 |
| 4,169,613 | 10/1979 | Barnett | 280/732 |
| 4,181,325 | 1/1980 | Barnett | 280/739 |
| 4,842,300 | 6/1989 | Ziomek et al. | 280/732 |
| 4,988,118 | 1/1991 | Good et al. | 280/743.1 |
| 4,988,119 | 1/1991 | Hartmeyer | 280/743.1 |
| 5,044,663 | 9/1991 | Seizert | 280/730.1 |
| 5,310,216 | 5/1994 | Wehner et al. | 280/743.1 |
| 5,316,337 | 5/1994 | Yamaji et al. | 280/743.1 |
| 5,445,414 | 8/1995 | Pittman et al. | 280/743.1 |
| 5,454,594 | 10/1995 | Krickl | 280/743.1 |

*Primary Examiner*—Kenneth R. Rice
*Attorney, Agent, or Firm*—Philip C. Peterson; Gerald K. White

[57] ABSTRACT

An inflatable air bag for cushioning restraint of an occupant in a motor vehicle is fabricated from a single pattern piece cut from a thin, strong, lightweight, flat segment of flexible sheet material by sewing or seaming along cut edges of the pattern in a designated sequence to provide an air bag having a shape when fully inflated, providing a maximum effective cushioning surface for engaging the vehicle occupant. The single pattern piece is symmetrical with respect to bisecting longitudinal and transverse central axes and includes central portion forming a large, occupant engaging surface area, pairs of side edge portions at opposite ends of the central portion forming opposite side walls of the inflated air bag and pairs of throat portions at opposite ends of the longitudinal central axis for forming an inlet throat of the air bag for receiving inflation gas.

20 Claims, 2 Drawing Sheets

SINGLE PIECE PATTERN AIR BAG

BACKGROUND OF THE INVENTION

1. Field of the Invention

The present invention relates to vehicle occupant restraint cushions commonly called air bags and adapted to be rapidly inflated with gas in the event of a crash or vehicle accident. More particularly, the air bag of the present invention is formed from thin, strong, light, flexible sheet material cut into a single pattern on a flat piece of the sheet material and sewn or joined along cut edges to provide a desired shape when the bag is rapidly inflated for protecting an occupant in a motor vehicle or the like.

2. Background of the Prior Art

Air bag restraint cushions of various sizes, shapes and materials have been available for use in providing protective restraint to occupants of motor vehicles. In fabricating many of these air bags it has been common practice to utilize multiple pattern pieces of sheet material sewn or seamed together to provide a completed air bag having a selected shape to provide a safety cushion for a vehicle occupant when the bag is rapidly inflated. However, prior art air bags having multiple pattern pieces are often difficult to fabricate, are somewhat labor intensive and are relatively high in cost. Many times pattern pieces of the air bag are easily lost or misplaced temporarily during the fabrication because of small size or large numbers of patterns for a single air bag. Sometimes pattern pieces are installed improperly in reverse order or backward orientation so that a relatively higher rate of rejects is common. Also, when a greater number of separate pattern pieces of sheet material having different diverse shapes are needed, inventory problems result and production rate is slowed.

Technicians and air bag fabricators often complain about prior art air bags being too hard to sew and prone to mismatching and misalignment of parts, sewing parts inside out, starting sewing in the wrong place, sewing the wrong parts together, etc.

When single piece air bags are provided in U.S. Pat. Nos. 3,810,654; 4,006,918; 4,169,613; 4,181,325; 4,988,118; 4,988,119; a desired final inflated shape is not always obtained that will provide maximum protection for a vehicle occupant. U.S. Pat. Nos. 5,044,663 and 4,842,300 disclose air bags having internal restraints or tethers for providing final shaping to an inflated air bag and these straps or tethers must be stitched in proper places within the air bag which complicates the fabrication thereof.

OBJECTS OF THE INVENTION

It is an object of the present invention to provide a new and improved air bag fabricated from a single pattern piece of flexible sheet material.

Yet another object of the present invention is to provide a new and improved single pattern piece air bag which is cost effective and easy to sew or fabricate.

Still another object of the present invention is to provide a new and improved single pattern piece air bag having a fully inflated shape designed to afford a vehicle occupant maximum safety protection and cushioning action in the event of an accident.

BRIEF SUMMARY OF THE PRESENT INVENTION

The foregoing and other objects and advantages of the present invention are accomplished in a new and improved inflatable air bag restraint cushion that is sewn or fabricated from a single pattern piece cut from a thin, flat sheet of strong, lightweight flexible material. The single pattern piece, air bag of the present invention when fully inflated has a side elevational view of generally triangular shape projecting outwardly from an air bag inflator module and has a horizontal dimension that increases or enlarges going away from the module to provide a maximum surface area for cushioning engagement with a vehicle occupant.

The single pattern piece utilized in the new and improved air bag of the present invention comprises a pattern that is substantially symmetrical with respect to a longitudinal central axis and includes a central portion also substantially symmetrical relative to a lateral central axis transversely bisecting the longitudinal central axis. The central portion of the pattern provides a rearwardly facing, relatively large cushioning surface for engagement with the vehicle occupant when the air bag is inflated. The pattern includes pairs of side portions at opposite ends of the central portion along the central axis, which side portions extend laterally outwardly of the longitudinal axis to form side walls of the inflated air bag. The pattern also includes a pair of throat portions at opposite ends of the longitudinal central axis joining each pair of side portions for forming an inlet for receiving inflation gas when the air bag is inflated.

The single pattern piece air bag is fabricated by sewing or seaming the pattern in multiple steps along a pattern edge on one side of the longitudinal central axis and repeated on a pattern edge on the opposite side. This is followed by sewing the throat portions together to form the gas inlet for the air bag. Dots, letters, numbers or other indicators may be provided along the edges of the cut single pattern piece to be sewn together for aiding a fabricator or technician in completing the air bag from the single pattern piece.

BRIEF DESCRIPTION OF THE DRAWINGS

For a better understanding of the present invention, reference should be had to the following detailed description taken in conjunction with the drawings, in which.

DETAILED DESCRIPTION OF A PREFERRED EMBODIMENT OF THE INVENTION

Figure 1:
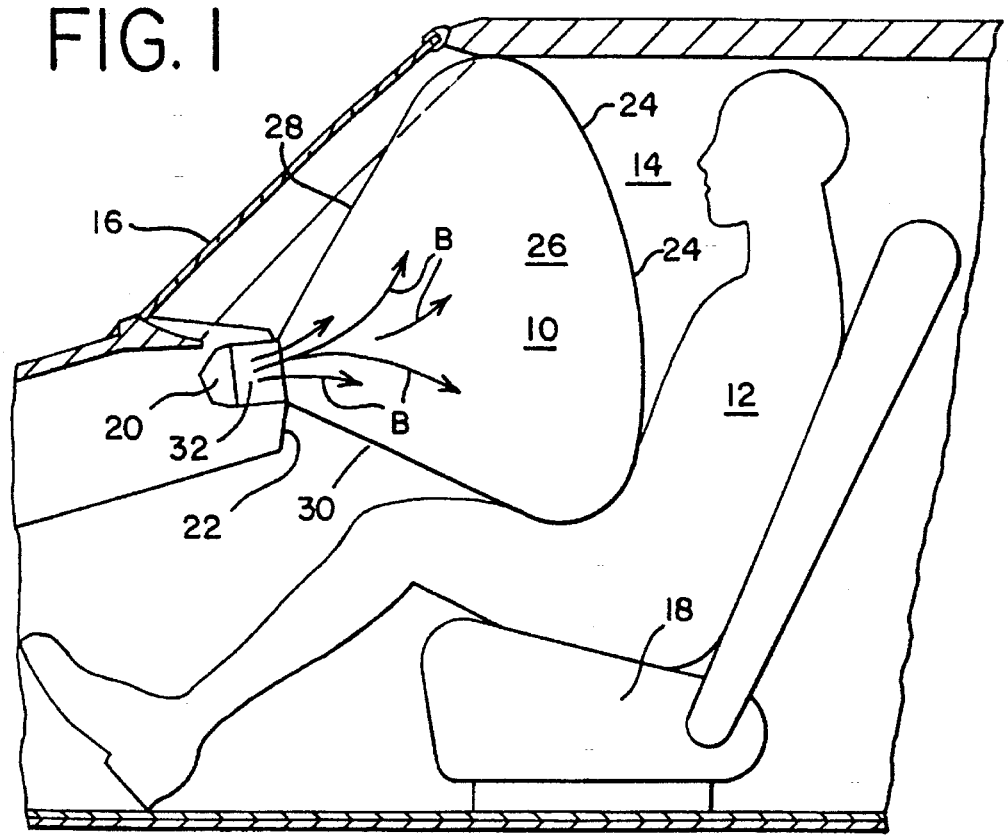
FIG. 1 is a side elevational view of a new and improved single pattern piece air bag in accordance with the features of the present invention shown in a fully inflated condition for cushioning an occupant in a motor vehicle.

Referring now more particularly to the drawings, therein is illustrated a new and improved single pattern piece inflatable air bag cushion 10 constructed in accordance with the features of the present invention and adapted to be rapidly inflated with gas for protecting a vehicle occupant 12 seated in a passenger compartment 14 of a motor vehicle 16 on a seat 18. The air bag 10 is normally contained in a folded-up condition in an air bag inflator module 20 mounted behind an instrument panel 22 of the vehicle and is adapted to be rapidly inflated in the event of an emergency with inflation gas supplied from the module. When rapidly inflated, the folded-up air bag 10 moves rapidly out of the module 20 in a rearward direction toward the occupant 12 and provides cushioning restraint to prevent or reduce injury in a vehicular crash or accident.

Figure 2:
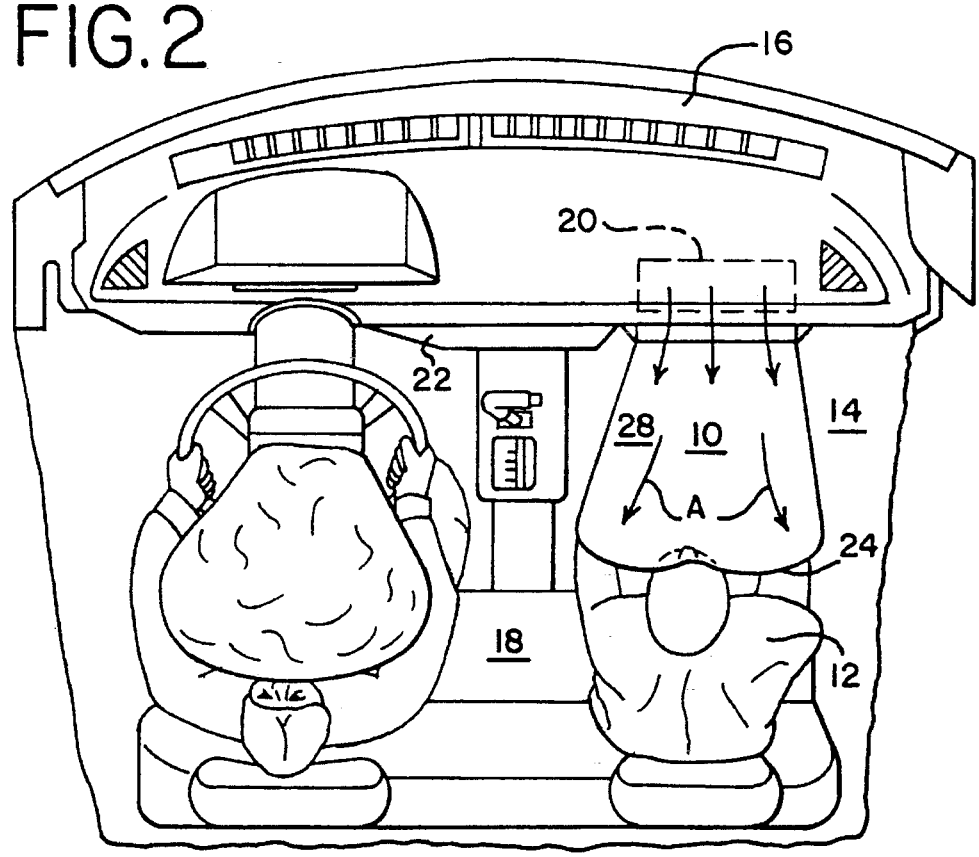
FIG. 2 if a top plan view illustrating the inflated air bag.
Figure 3:
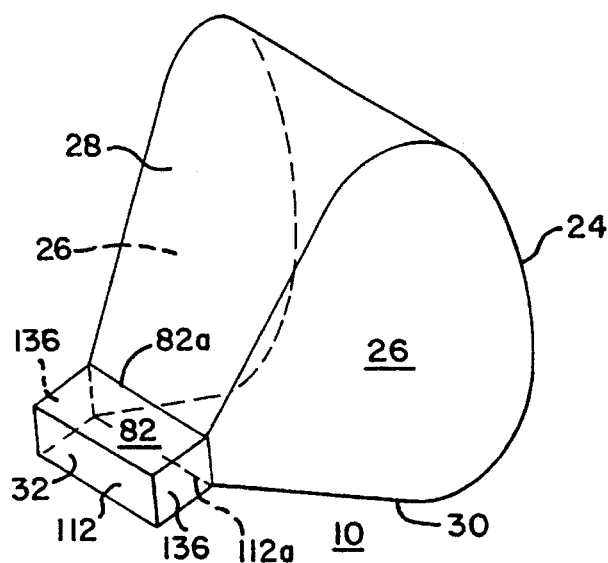
FIG. 3 is an isometric view of the inflated air bag from a gas inlet end.
Figure 4:
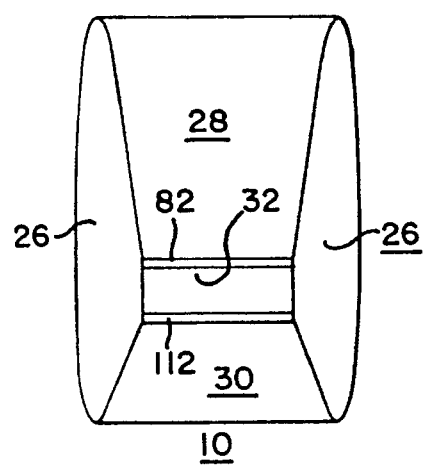
FIG. 4 is a front side elevational view of the inflated air bag.
Figure 5:
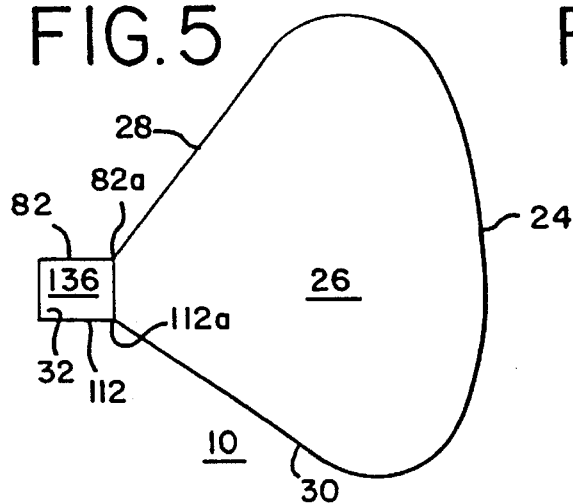
FIG. 5 is a side elevational view of the inflated air bag.
Figure 6:
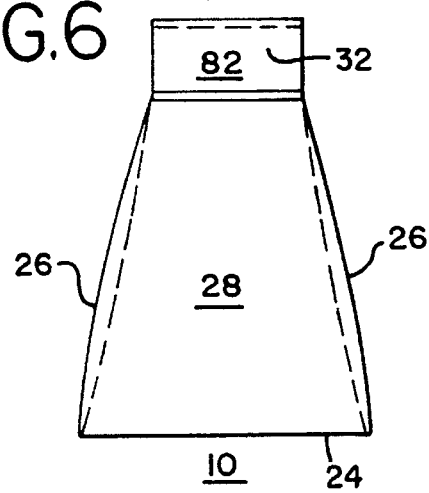
FIG. 6 is a top plan view of the inflated air bag.

Referring to FIGS. 1–6, when the air bag 10 is fully inflated, a relatively large, generally rectangular-shaped cushioning surface 24 is developed to engage the front of the vehicle occupant 12 and prevent injury. The air bag 10 has generally triangularly-shaped opposite sides 26 (FIGS. 3 and 5) and upper and lower, sloping, top and bottom walls 28 and 30, respectively. The forward end portions of the side walls 26, top wall 28 and bottom wall 30 converge toward an inlet chute 32 having a forward end secured with the air bag module 20 to receive inflation gas. As shown in FIGS. 2 and 6, the inflated air bag 10 increases in width or transverse dimension outwardly toward the occupant 12 to provide a maximum width for the cushion surface 24. Similarly, the vertical dimension of the inflated air bag 10 increases outwardly away from the inlet chute 32 toward the occupant 12 to provide a maximum vertical expanse for the cushion surface 24. As shown in FIGS. 1 and 2, the inflation gas from the air bag module 20, moves rearwardly toward the occupant 12 as the air bag 10 is inflated and spreads out laterally and vertically as indicated by the arrows "A" and "B". The high velocity gas flow through the relatively small size, rectangular flow cross-section of the inlet chute 32 is reduced as the flow cross-section of the air bag 10 enlarges toward the occupant. The air bag 10 provides an ideal shape for effectively utilizing the quantity of inflation gas that is discharged from the air bag module 20 to provide an extremely efficient cushioning action.

Figure 7:
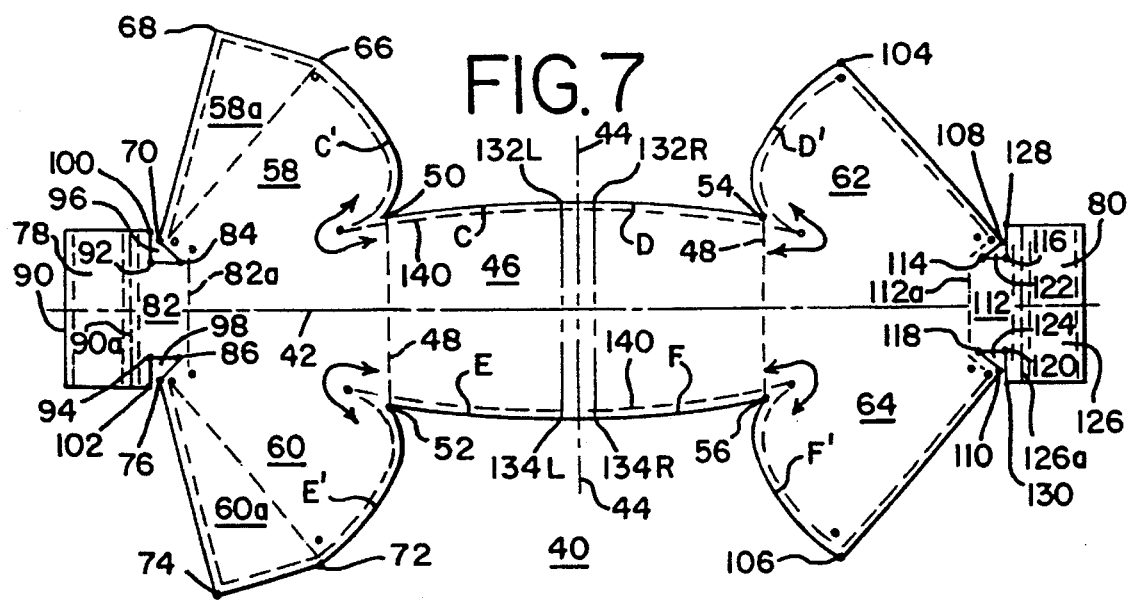
FIG. 7 is a plan view of a single pattern piece cut from flat sheet material before fabrication to form the finished air bag.

Referring now to FIG. 7, the air bag 10 is formed from a single pattern piece 40 cut out from a thin, flat segment of strong, lightweight, flexible, resilient sheet material into the shape as shown. The shape of the pattern 40 is substantially symmetrical with respect to a longitudinal central axis 42 and a transverse central axis 44 which bisects the longitudinal axis at right angles at the center thereof.

A central portion 46 of the pattern 40 between dotted lines 48 parallel and spaced on opposite sides of the transverse axis 44 and extending transversely outwardly on opposite sides of the longitudinal axis 42 forms the generally rectangular cushion 24 of the inflated air bag 10. The lines 48 extend between points 50 and 52 spaced to the left of the transverse axis 44 (FIG. 7) and points 54 and 56 spaced on the right hand side of the transverse axis, respectively. As viewed in FIG. 7, the points 50 and 52 on the left hand boundary line 48 are spaced on opposite sides of the longitudinal axis 42 and similarly, the points 54 and 56 on the right hand boundary line are spaced on opposite sides of the longitudinal axis.

In accordance with the present invention, the pattern 40 includes two pairs of side portions 58, 60 and 62, 64, respectively, disposed at opposite ends of the central portion 46 along the longitudinal axis 42. Each pair of side portions 58, 60 and 62, 64, cooperate to form a side wall 26 of the air bag 10 when inflated. The pair of side portions 58, 60 on the left hand end of the central portion 46 of the pattern 40 are different in shape from the pair of side portions 62, 64 at the right hand end in that triangularly-shaped overlap portions 58a, 60a, defined between pattern edge points 66, 68, 70 and 72, 74, 76 are provided to form strengthening overlapping segments with cooperating pairs of side portions 62, 64 at the opposite end of the central portion 46.

The cut pattern 40 of the air bag 10 also includes a pair of generally rectangular-shaped, inlet chute-forming, end portions 78 and 80 spaced at opposite ends of the respective pairs of side portions 58, 60 and 62, 64. The left hand end portion 78 is symmetrical with respect to the longitudinal axis 42 and includes a narrow, inner throat segment 82 extending outwardly from points 84 and 86 for forming a rectangular upper wall 88 of the inlet chute or throat 32 of the air bag 10.

The inner throat segment 82 engages a larger-in-width, outer throat segment 90 at points 92 and 94 aligned with the points 84 and 86, respectively, parallel of and on opposite sides of the longitudinal axis 42. Small, generally triangular-shaped cut out spaces 96 and 98 are formed and bordered on two sides by lines extending between points 70 and 84 and between points 86 and 96 and by lines extending between points 84 and 92 and points 86 and 94, respectively.

A third side of the triangular-shaped cut out 96 is formed by an edge line extending between the point 92 and an outer point 100 and a third side of the triangular-shaped cut out 98 is formed by an edge line between the point 94 and an outer point 102.

The opposite end, side portions 62, 64 of the pattern 40 have outer points 104 and 106, respectively, and innermost points 108 and 110. The right hand end segment 80 includes a narrow width, rectangular-shaped inner segment 112 matching the segment 82 at the opposite end of the pattern 40 and designed to form a bottom wall of the inlet chute 32. Opposite edges of the inner segment 112 extend between points 114 and 116 and points 118 and 120 thereby providing opposite edge lines parallel of and on opposite sides of the longitudinal axis 42 and forming sides of respective triangular-shaped cut outs 122 and 124, respectively. The inner end segment 112 of the right hand end portion 82 joins a larger, generally rectangular-shaped outer end segment 126 similar in size to the outer end segment 90 at the opposite end of the pattern 40. The outer segment has inner end corner points 128 and 130 which cooperate with points 116 and 120 respectively to form sides of the respective triangular-shaped cut outs 122 and 124.

After the single pattern piece 40 is cut out to the shape depicted in FIG. 7 and as described heretofore, fabrication to form a completed air bag 10 having the fully inflated shape as shown and described is commenced by sewing, stitching and/or seaming together cut edges C and C' extending from the common point 50 to point 66 on the side portion 58 and point 132L on the central portion 46 on the lateral axis 44. The foregoing operation is followed by joining together cut edges D and D' commencing at the common point 54 and extending to point 104 on the side portion 62 and point 132R on the central portion 46. After the foregoing operations are completed, opposite halves of the pattern 40 are folded about the laterial axis 44 and a pleat is formed so that points 132L and 132R overlie one another and the points 66 and 104 are all secured together in overlying position.

Sewing, stitching and/or seaming is continued by joining cut edge lines E and E' beginning at common points 52 and extending to point 72 on the side portion 60 and to point 134L on the central portion 46. Fabrication is continued by joining lines F and F' commencing from the common point 45 to point 106 on the side portion 64 and point 134R on the central portion 46.

Further fabrication is continued by joining together points 70 and 108 to points 132L, 132R, 66 and 104 which have already been joined, and by joining together points 76 and 110 to points 134L, 134R, 72 and 106 which have previously been secured together. The air bag 10 is now almost completed except for the formation of the integral throat or inlet chute 32.

The throat 32 is formed by folding the inner end segments 82 and 112 outwardly along respective fold lines 82 and 112a, respectively, followed by joining together edges of the triangular cut outs 96, 98, 122 and 124 as follows. Commencing at common point 84, the edges running to points 70 and 92 are stitched together and commencing at common point 114 the edges running to points 108 and 116 are stitched together. Similarly, commencing at common point 86, the edges running to points 76 and 94 are stitched together and commencing at common point 118, the edges running to points 110 and 120 are stitched together.

Opposite edge portions of the pattern end portions 78 and 80 are next folded inwardly along lines coincident with lines 84–92, 114–116, 86–94 and 118–120, respectively, to form opposite sides 136 (FIGS. 3 and 5) of the inlet chute or throat 32 and thereafter outer end segments 90 and 126 are folded outwardly along fold lines 90a and 126a to provide flaps for securing the throat in place in the air bag module 20.

It is thus seen that the air bag 10 having an especially efficient shape as described for cushioning support of an occupant 12 is fabricated from a single pattern piece 40 with little or no chance for mismatches, wrong side attachments, reverse order placements, etc., which were too often common with prior art air bags. As shown in FIG. 7, the pattern 40 itself is made with dotted lines, arrows, circles, printed indicia 140, etc., thereon to facilitate fabrication and aid a technician in sewing, stitching and/or seaming an air bag 10 from a single pattern piece.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An inflatable air bag for cushioning restraint of an occupant in a motor vehicle, said air bag formed from a single pattern piece cut from a flat sheet of thin, strong, flexible sheet material, said pattern being substantially symmetrical with respect to a longitudinal central axis and including a central portion substantially symmetrical with respect to a lateral central axis transversely bisecting said longitudinal axis for providing a rearwardly facing surface of said air bag when inflated for cushioning engagement with the occupant, pairs of side portions at opposite ends of said central portion extending longitudinally thereof and laterally outwardly in opposite directions from said longitudinal axis, each pair of side portions forming a side wall of said air bag when inflated joining said central portion on opposite sides, and a pair of throat portions at opposite ends of said longitudinal axis joining each pair of side portions for forming a throat for receiving inflation gas during inflation of said air bag.

2. The inflatable air bag of claim 1, wherein:
said lateral axis comprises a central fold line and said central portion includes a pair of parallel fold lines spaced equilaterally on opposite sides of said central fold line.

3. The inflatable air bag of claim 2, wherein:
said central portion of said pattern has a maximum transverse dimension at said central fold line and has an outer edge segment curving inwardly toward said longitudinal axis to a minimum transverse dimension at a region of junction with a side portion.

4. The inflatable air bag of claim 3, wherein:
said side portions of said patterns have an outer edge segment curving laterally outwardly away from said region of junction with said central portion.

5. The inflatable air bag of claim 4, wherein:
each of said outer edge segments of said central portion of said pattern has a length substantially equal to that of the outer edge segment of a side portion joined therewith at a region of junction.

6. The inflatable air bag of claim 1, wherein:
said throat portions at opposite ends of said pairs of side portions are joined together forming an integral inlet chute for inflation gas filling said air bag.

7. The inflatable air bag of claim 1, wherein:
said air bag has an inflated shape including a pair of generally triangularly-shaped opposite sides.

8. The inflatable air bag of claim 7, wherein:
said triangularly-shaped opposite sides spread farther apart from each other away from said throat portions.

9. The inflatable air bag of claim 8, wherein:
said triangularly-shaped opposite sides join opposite, generally vertically oriented opposite edges of a generally rectangularly-shaped cushion surface for restraining the occupant of a motor vehicle.

10. The inflatable air bag of claim 9, wherein:
said rectangularly-shaped cushion surface is spaced oppositely apart from said throat portions.

11. An inflatable air bag for cushioning restraint of an occupant in a motor vehicle, said air bag formed from a single pattern piece cut from a flat sheet of thin, strong, flexible sheet material, said pattern being substantially symmetrical with respect to a longitudinal central axis and including a central portion substantially symmetrical with respect to a lateral central axis transversely bisecting said longitudinal axis for providing a rearwardly facing, generally rectangular-shaped cushion surface of said air bag when inflated for cushioning engagement with the occupant, pairs of side portions at opposite ends of said central portion extending longitudinally thereof and laterally outwardly in opposite directions from said longitudinal axis, each pair of side portions forming a generally triangular-shaped side wall of said air bag when inflated joining said central portion on opposite sides, and a pair of throat portions at opposite ends of said longitudinal axis joining each pair of side portions for forming a throat for receiving inflation gas during inflation of said air bag.

12. The inflatable air bag of claim 11, wherein:
said lateral axis comprises a central fold line and said central portion includes a pair of parallel fold lines spaced equilaterally on opposite sides of said central fold line.

13. The inflatable air bag of claim 12, wherein:
said central portion of said pattern has a maximum transverse dimension at said central fold line and has an outer edge segment curving inwardly toward said longitudinal axis to a minimum transverse dimension at a region of junction with a side portion.

14. The inflatable air bag of claim 13, wherein:
said side portions of said patterns have an outer edge segment curving laterally outwardly away from said region of junction with said central portion.

15. The inflatable air bag of claim 14, wherein:
each of said outer edge segments of said central portion of said pattern has a length substantially equal to that of the outer edge segment of a side portion joined therewith at a region of junction.

16. The inflatable air bag of claim 11, wherein:
said throat portions at opposite ends of said pattern are joined together forming an integral filling chute for supplying inflation gas between said side walls to move said cushion surface outwardly toward the occupant of a motor vehicle when said air bag is rapidly inflated.

17. The inflatable air bag of claim 16, wherein:

said filling chute has a generally rectangular-shaped flow cross-section for directing inflation gas outwardly to spread apart said opposite side walls during air bag inflation.

18. The inflatable air bag of claim 11, wherein:

each pair of side portions forms a single side wall of said air bag joined along a line extending between a throat portion and said rectangular-shaped cushion surface.

19. The inflatable air bag of claim 11, wherein:

each pair of side portions forms a portion of a top wall and a bottom wall of said air bag when inflated.

20. The inflatable air bag of claim 19, wherein:

said top wall and said bottom wall extend outwardly of said throat portions to join upper and lower edge portions of said rectangular-shaped cushion surface when said air bag is inflated.

\* \* \* \* \*